United States Patent [19]

Jones

[11] Patent Number: 5,801,333

[45] Date of Patent: Sep. 1, 1998

[54] LOW-ODOR SINGLE ELEMENT CABLE CONNECTION COVER

[76] Inventor: Michael G. Jones, 220 Bingham St., San Marcos, Calif. 92069

[21] Appl. No.: 780,289

[22] Filed: Jan. 8, 1997

[51] Int. Cl.⁶ ........................................... F16L 11/12
[52] U.S. Cl. ............................................... 174/74 A
[58] Field of Search ................ 174/DIG. 8, 74 A, 174/75 B, 74 R, 75 R, 25 B, 93, 77 R; 428/34.1, 34.9

[56] References Cited

U.S. PATENT DOCUMENTS

| | | | |
|---|---|---|---|
| 4,401,218 | 8/1983 | Erlichman | 206/446 |
| 4,607,866 | 8/1986 | Erlichman | 285/45 |
| 4,865,890 | 9/1989 | Erlichman | 428/35.1 |

OTHER PUBLICATIONS

Harper (ed.) Handbook of Plastics and Elastomers, pp. 4–50 through 4–65 (McGraw-Hill Book Co., 1975).
1996 Rubber Red Book (48th edn.) [Intertec Publg.: 1996], pp. 288, 290 and 292.
Mark et al. (eds.), Encyclopedia of Polymer Science and Technology, vol. 15, pp. 380–384 (John Wiley & Sons, 1989).
Roff et al., Fibres, Films, Plastics and Rubbers, §55, pp. 509–514 (Butterworths, 1971).

Primary Examiner—Bot L. Ledynh
Assistant Examiner—Joseph Waks
Attorney, Agent, or Firm—Brown, Martin, Haller & McClain, LLP

[57] ABSTRACT

A low odor cover for a connector of a cable is disclosed, which has a sleeve which is chemically swellable and which is initially in dilated configuration, and which subsequently shrinks into place by evaporation of the volatile dilation composition. The sleeve is made of a high density elastomeric material, such as a natural or synthetic rubber, preferably (EPDM), neoprene or Hypalon™ rubbers. The volatile liquid combination dilation composition used is composed of a $C_7$–$C_8$ aliphatic hydrocarbon component and a fluorocarbon component. The device provides a protective cover for a cable connection or splice which can be easily installed, quickly shrunk into tight vapor resistant protective covering within a matter of a few minutes, and can be installed without the need for any application of heat or use of special tools, equipment or materials.

21 Claims, 1 Drawing Sheet

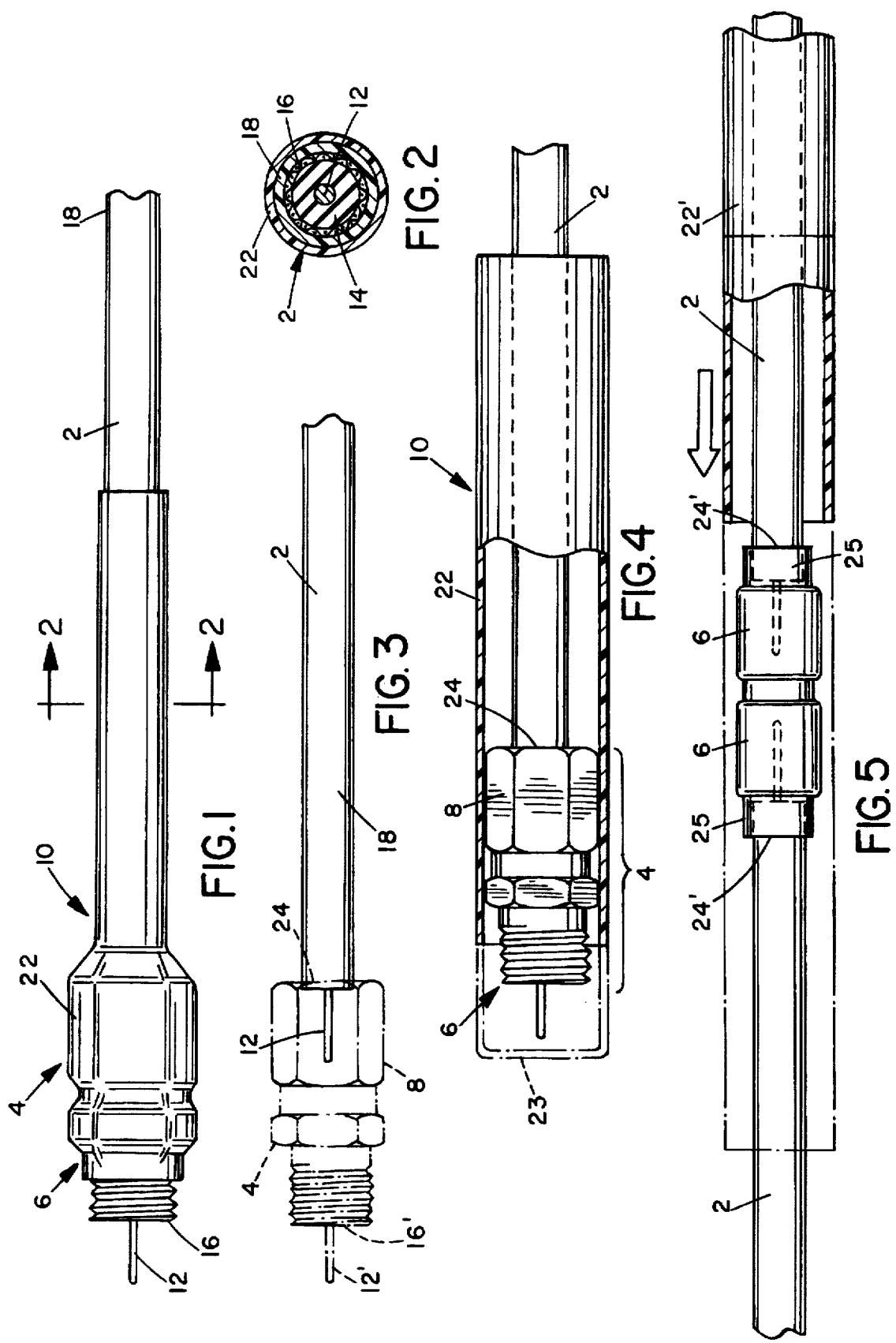

LOW-ODOR SINGLE ELEMENT CABLE CONNECTION COVER

BACKGROUND OF THE INVENTION

1. Field of the Invention

The invention herein relates to electrical cable, such as television transmission cable, and connectors therefor. More particularly, it pertains to cover devices to protect such connectors from the ambient environment.

2. Description of the Prior Art

Many cable connections are positioned where they are subject to adverse ambient environments, particularly where the connection will be subject to moisture contact from rain, snow or humidity. A typical example is a connection for a television signal transmission cable, where the cable is attached to a transmission facility outlet, a retransmission station or a subscriber's connection, such as a residence. Some protection may be afforded by enclosing the connection in a housing, such as the small junction boxes for subscriber hookups commonly seen in residential neighborhoods. However, such housings are not completely weathertight, and in any event many connections remain in the open, or are located in positions where housings are not practical.

Further, in many cases connections must be made during adverse weather. If, for instance, a cable television circuit or an electric power circuit goes out because of a heavy rainstorm, the immediate demands for restored service by the subscribers require the transmission company to send repair people to make the necessary repairs to the cable as quickly as possible, notwithstanding that the storm may be continuing. Such repairs to a large extent require the installation of new connectors, either for cable splices or for re-connection to transmission or receiving facilities. However, to minimize potential damage to the connectors, their exposure to the elements should be as brief as possible. This requirement for brief exposure (i.e., quick repair) is of course reinforced by the fact that commonly during such a storm there are many service disruptions and the repair people need to spend as little time as possible repairing each individual connection so that they will be able to move quickly to restore service systemwide.

It has been known for some time that it is advantageous to cover such cable connections (whether television transmission cable or other types of electrical cable) to minimize the exposure of the connections to the elements, particularly to moisture. Since the cable segments themselves have moisture impervious coverings throughout their length, the particularly vulnerable portions of a cable system are the individual connectors, which are usually screw-type or soldered metal fittings. Wrapping such connectors with moisture-resistant tape has not proved satisfactory, since the adhesive holding the tape does not adhere well to wet surfaces to start with, and even if initially well-adhered, tends to deteriorate with age and the tape becomes loosened. In addition, tape wrapping is a time consuming procedure and often difficult to do properly in cramped or enclosed locations.

Heat shrinkable tubing has also been used to cover connections. Heat shrinkable tubing is tubing made of thermoplastic polymeric materials which, when subjected to elevated temperatures, shrink and contract around the connection. While such heat shrink tubing has proved more effective than tape wrapping, it still has a number of serious deficiencies. For instance, heat shrinking takes a considerable amount of time for the large diameter, relatively thick wall tubing necessary to use with large diameter cable connectors. Thus, cable installers or repair crews find that while the cable connections themselves may be made quickly, an inordinate amount of time must subsequently be spent slowly shrinking the heat shrink tubing to fit. The shrinking cannot be expedited by applying additional heat. The additional heat will simply char and damage the plastic tubing, rather than appreciably speeding the shrinking process. Further, excessive heat applied to the cable protector will also damage the foam dielectric component of the cable itself. Of course, in many instances, particularly at remote locations, a suitable source of heat is not available to the installation or repair crew. Similarly, in many installations the positioning of the connection is such that even where a heating source is available, the heat cannot be applied evenly to the tubing because the access by the heat source is restricted. Thus, the use of heat shrinkable tubing has had only limited applicability and has been essentially unsuitable where rapid installation or repair is needed to limit the exposure of the connections to the elements.

Protectors using chemical dilation and shrinking have been considered in the past, but until recently were not practical. Those materials preferentially used in the industry had a limited degree of diameter change, and the variations in diameters of cables and cable connection hardware were greater than the structure of such prior art cable protectors utilizing chemical dilation could accommodate. Recently, however, I invented a new type of protector product which is chemically dilatable over an appropriate range of cable and cable connector sizes have been formulated and developed by one of the applicants herein. My protector products have met with substantial success in the field, since they are easy to install and use and provide for superior protection as compared to the competitive materials. These products are the subject of my pending U.S. patent application Ser. No. 08/541,135, filed Oct. 11, 1995.

These products, while quite successful, have (like the prior art products before them) been recognized as having a pervasive and disagreeable odor, due to the nature of the dilation solvents which have been necessary for their manufacture and operation. While odor does not affect their superior installation and performance, it is annoying and unpleasant to the installation workers who must handle the products and can affect the ambient environment for a time, especially when the protectors are installed in a confined space. Until now, however, no formulations of solvents were known which did not have a harsh odor of some kind and yet were effective for dilation of the new products. Different solvents were known to have different odors, but all were pervasive, disagreeable and much disliked by the installation workers.

Further, these products were "two element" products, in that they required both an inner and an outer sleeve for operation. Two-element products are more difficult for an installer to manipulate than would be a one-element product, which would have only a single sleeve. Heretofore, however, workable dilatable one-element products were not available.

SUMMARY OF THE INVENTION

The present invention represents a significant improvement over the products I previously developed and claimed in the aforementioned patent application, in that the products of this invention are both single element products and of a "low odor" formulation which imparts essentially no unpleasant odor to the product. The products of this invention are therefore not only as useful and exceptionally functional as the prior Jones products, but now are also "user friendly," in that they can be easily handled and installed as single element products and do not create an environment with an odor disagreeable to the installer or impart a disagreeable odor to their surroundings once installed. This unique product therefore incorporates in one device a unique single element structure and a novel combination of solvents which synergistically provide the requisite dilation and evaporation shrinkage properties to the product but which do not generate any unpleasant or disagreeable odor.

The invention therefore is of a "low odor" protective cover for a cable connection or splice which is essentially free of disagreeable odors, which can be easily installed, quickly shrunk into tight vapor resistant protective covering within a matter of a few minutes rather than requiring extended periods of time, and can be installed without the need for any application of heat or use of special tools, equipment or materials. It will be seen that this invention thus is a substantial improvement over both the heat shrink products of the past and my previous products, since the protective device of the present invention is a single element device which shrinks entirely by evaporation of the swelling agent and does not require any effort on the part of the installer nor the application of any tools or heat sources, and also is free of disagreeable odor. The present device is easy to install, merely sliding down the cable once the connection is made, and thus can be satisfactorily installed even in locations where access is difficult (such as a connection being made in a recessed hole) or when inclement weather such as rain would make use of a heating device either awkward or impossible. Further, even in a confined location, the new products do not impart a pervasive, lingering disagreeable odor to the ambient environment.

The device comprises a sleeve which is chemically swellable and which is initially in a dilated configuration, such that it subsequently shrinks into place merely by evaporation of the volatile swelling solvent and seals the cable connection against exposure to ambient atmospheric conditions, dust, moisture, etc. The critical element in the present invention is the dilating agent, which is used is a mixture of a $C_7$-$C_8$ aliphatic hydrocarbon component and a fluorocarbon component, both components being liquid and volatile at ambient conditions. In preferred embodiments, the hydrocarbon component comprises a plurality of $C_7$-$C_8$ hydrocarbon compounds, preferably a mixture of heptane and octane isomers. The octane isomer:heptane isomer ratio is commonly 1.5–6:1, preferably 2–5:1. The fluorocarbon component normally comprises a chlorofluorocarbon compound, preferably a chlorofluoro-methane, chlorofluoroethane or chlorofluoropropane compound, and more preferably a dichlorofluoroethane compound. The two components are normally in a volumetric ratio of 2–20:1, preferably 5–12:1 hydrocarbon component to fluorocarbon component.

Therefore, in its broadest embodiment, the invention is a protective cover for a cable connector, the connector being affixed to an end of a cable and having an outside diameter greater than an outside diameter of the cable, the cover comprising a elongated annular sleeve formed from a material expandable by contact with a dilating chemical composition and shrinkable upon removal of the contact with the chemical composition; the chemical composition comprising a mixture of a $C_7$-$C_8$ aliphatic hydrocarbon component and a fluorocarbon component, both components being liquid and volatile at ambient conditions; the cover with the sleeve in chemically expanded state being moveable into disposition covering the connector and a portion of the cable attached thereto, with the sleeve covering at least the portion of the cable and the connector; whereby when the cover is so disposed over the connector and the portion of the cable and removed from contact with a source of the chemical composition, the chemical composition evaporates from the sleeve and the sleeve thereupon shrinks and covers the outside diameters of the connector and the attached portion of the cable sufficiently to sleeve to form a tightly fitted and substantially immovable covering secured around the connector and at least a portion of the inner sleeve, thereby preventing the connector from coming into contact with adverse ambient components.

The sleeve is preferable made of a swellable elastomeric material, preferably a natural or synthetic rubber. Suitable rubbers include EPDM rubber, neoprene or chlorosulfonate polyethylene (Hypalon™) rubber, of which EPDM rubber is preferred.

BRIEF DESCRIPTION OF THE DRAWINGS

FIG. 1 is a side elevation view of a completed sleeved connector.

FIG. 2 is an enlarged sectional view taken on line 2—2 of FIG. 1.

FIG. 3 is a side elevation view of a cable end with the inner sleeve in place, a connector being indicated in broken line.

FIG. 4 is a side elevation view, with portions cut away, showing the outer sleeve in place before shrinking.

FIG. 5 is a side elevation view of a splice joint with the sleeves being adjusted to the final position.

DETAILED DESCRIPTION AND PREFERRED EMBODIMENTS

The device of the present invention is best understood by reference to the drawings. A completed wrapped cable connection is illustrated in FIG. 1. The cable 2 itself has its own insulated and protective covering which is conventional and need not be further described. Where the cable terminates, the cable connector 4 is a combination of a screw coupling 6 and a block 8 attaching the connector 4 to the cable 2 itself. This overall connector 4 is conventional and need not be fully described. Suffice it to say that the connector provides electrical continuity from the cable 2 to the device (not shown) to which the cable is being attached. This device may be a signal transmitter or a receiving device, such as a service receptacle used to provide service such as cable television to a residence or other building, or, in the case of a cable splice, it may be another similarly fitted cable. It is this connector 4 which is to be protected from the elements, since its several separate parts makes it vulnerable to infiltration by moisture, dust, etc. which can degrade the connector and interfere with or prevent proper signal transmission between the cable and the transmitting or receiving device. (The splice configuration where two cables are connected together will be discussed below in connection with FIG. 5.) It will be understood that the cable may be a copper wire cable (as illustrated in the example) or other metal wire cable (such as aluminum cable) or may be a fiber optic cable. The nature of the cable itself and its method of signal transmission is not critical to the present invention.

The protective cover device of the present invention is generally indicated at 10. The structure of the entire system is best indicated by reference to FIG. 2. The interior electrical cable has a central conductor 12 surrounded by electrical insulation 14 (often a foam dielectric) which is surrounded by a second electrical conductor 16 (typically a ground), which in turn is surrounded by the external insulation and protective covering 18 of the cable 2. The two conductors 12 and 16 continue in an appropriate signal transmission manner through the connector 4 to appear as connections 12' and 16', respectively, for attachment to corresponding structures in the device to which the cable is to connected. The present invention 10 surrounds the cable 2 and comprises sleeve 22, which will be described in detail below.

Sleeve 22 is in elongated tubular form and comprises an elastomeric material which is swellable by absorption of a chemical swelling agent and which shrinks to its initial size upon removal of such agent. Numerous rubbers and other elastomers are known to have this property and a variety of different swelling agents are available in the marketplace. In the present invention, EPDM rubber is the most desirable material. The sleeve will have a wall of a thickness which is thin enough to allow it to conform readily to the various surfaces of the connector 4 and cable ends 2 the inner sleeve 20 following shrinking but yet of sufficient thickness to insure that the sleeve following shrinkage provides a covering impervious to ambient moisture. In addition, it is preferred that the sleeve 22 have sufficient rigidity to prevent the cable from flexing significantly at the point of attachment to the connector 4, so that the cable does not become frayed or broken at that vulnerable point.

A number of elastomers suitable for use as the sleeve in the present invention are widely described in the literature. See, for instance, Morton, RUBBER TECHNOLOGY (2nd edn.: 1973). Most preferred are the terpolymers known as "EPDM" rubbers and made from ethylene/propylene diene copolymer with a methylene component. EPDM rubbers are described in detail in chapter 9 of the Morton reference. Other suitable rubbers include the neoprene (polychloroprene) rubbers and the chlorosulfonated polyethylene rubbers (the latter available under the trademark "HYPALON"); both of these are described in Morton, chapter 13. Commercial sources of the various elastomers are also listed.

In my prior products the dilation agent was exemplified by the aromatic compounds benzene, toluene or one of the xylenes. It was mentioned that other then-known swelling agents could be used for dilation. However, at that time no dilation agent was known which had all the properties of being free of pervasive, offensive odor, capable of dilating the elastomers sufficiently to allow manufacture and use of cable connection covers, safe, readily handled and sufficiently economical for practical use. Standard industry texts, such as the annually published RUBBER RED BOOK (Argus Business Press), listed the aromatics benzene, toluene and the xylenes as the principal swelling or dilation agents; many of the other swelling agents found in the literature were mainly known only at the laboratory level. The aromatics themselves of course have drawbacks; they are expensive, have strong and disagreeable odors, are subject to numerous environmental restrictions and often require special handling or disposal.

I have now developed a single element product which uses a novel "low odor" dilation composition, which is a combination of non-aromatic compounds. Specifically, the dilation composition that is to be used is a mixture of at least one $C_7$–$C_8$ aliphatic hydrocarbon component and at least one fluorocarbon component, both components being liquid and volatile at ambient conditions, as the dilation composition. Normally the hydrocarbon component is a mixture of two or more $C_7$–$C_8$ aliphatic hydrocarbon compounds, preferably a mixture of heptane and octane isomers. The octane isomer:heptane isomer ratio is commonly 1.5–6:1, preferably 2–5:1. I have had good results with liquid isoparaffinic mixtures commercially available under the tradename "ISOPAR" from Exxon Chemical Co. I prefer, however, to use liquid mixtures commercially available from Phillips Chemical Co. under the tradename "SOLTROL." I have had particular success with the mixture available under the trade designation "SOLTROL 10," which is identified by the vendor as a mixture of, by volume, 28% heptane isomers and 72% octane isomers, of which 62% is 2,2,4-trimethylpentane and 10% is other octane isomers. There is no significant aromatic content.

The fluorocarbon component is normally a chlorofluorocarbon compound, preferably a chlorofluoromethane, chlorofluoroethane or chlorofluoropropane compound, and more preferably a dichlorofluoroethane compound. I have had particularly good results with 1,1-dichloro-1-fluoroethane, available commercially under the trade designation "FLUOROCARBON 141B" from ICI General Chemicals.

The two components are normally present in a volumetric concentration of about 60%–99%, preferably about 80%–95%, of the hydrocarbon component, with the balance being the fluorocarbon component. In a particularly preferred embodiment, I use (by volume) 90% of the SOLTROL 10 hydrocarbon mixture and 10% of the FLUOROCARBON 141B 1,1-dichloro-1-fluoroethane; this combination is preferred for the "volatile dilation composition" used in the practice of the invention.

The combination is a "low odor" composition. By "low odor" I mean that, in contrast to the prior art products and my previous products, the products of this invention do not exhibit any pervasive, harsh, disagreeable or otherwise unpleasant odor. As with any elastomer-based product, there may be a slight rubbery odor, but nothing that is offensive or strong. These products are therefore greatly improved in acceptability to users, since the mild odors which may be present are completely inoffensive.

In the preferred practice of the invention the cover 10 comprising the sleeve 22 is immersed in the volatile dilation composition, preferably within a liquid- and vapor-tight container into which the appropriate quantity of the solvent combination has previously been measured. (A small excess of free dilation composition may often also be present inside the container, to insure that the sleeves are fully saturated.) Within the container the sleeve 22 becomes dilated and expanded as it becomes saturated with the composition. The container is sealed promptly, which maintains the sleeve 22 in its swollen state, saturated with the dilation composition. The product is provided to the field sealed in the vapor tight container, to prevent escape of the volatile dilation composition. On the job site, the cable installer opens the vapor tight container and withdraws the protective device 10 in its chemically dilated configuration. The device is then slipped over the cable at a point slightly behind the connector 4. The installer then makes the connection of the cable to the fitting on the transmission or reception device, or with another cable, in a conventional manner. The device 10 of this invention is then moved along the cable 2 until substantially all of the connector 4 is within the sleeve 22 and the connection is essentially fully covered by the sleeve 22. This is best illustrated in FIG. 1, which shows a connector almost at the point of full coverage.

Normally the sleeve 22 is slipped over the cable either at a free end or before the installer attaches the connector 4 to the end of the cable. Repair situations are generally the same as installations, since cable damage most often occurs to the connector or at the connector/cable junction. The repairer removes the old connector 4 from the cable and installs a new connector. Prior to installing the new connector, however, the repairer slips the device 10 over the free end of the cable and subsequently moves it into position for shrinkage as described. In some repair cases it may be necessary to cut the cable some distance behind the already-emplaced connector to get the device on, in which case a splice of the type shown in FIG. 5 can later be made. Also, with some types of cable damage the cable remaining after the connector and damaged portion have been removed may be too short (commonly by a few inches) to reach the connection point. In such cases an extender is attached to the free end of the connector to bridge the gap, or an extended connector is used. In either case the sleeve 22 will be chosen with enough length to cover the entire connector/extender assembly.

Once the device is in place with the sleeve 22 covering substantially all of the connection (including the connector block of the cable receiving fitting), the installer's job is essentially completed. He or she only needs to leave the assembly exposed to the ambient air for a few minutes, during which time the volatile dilation composition rapidly evaporates from the sleeve 22, causing it to shrink substantially from its enlarged swollen position. The shrinking causes the sleeve 22 to shrink into conformity with the shape of the connector and simultaneously to become compressed against and conform to the outer surface of the cable end, all of which is also best illustrated in FIG. 1.

Usually the inside diameter of the sleeve 22 after dilation is substantially equivalent to the outer diameter of the connector 4, such that the device 10 in its initial dilated configuration initially will permit relatively easy fit of the sleeve over the cable and connector. This may be a slight clearance fit, but it may also be a slight interference fit. If an interference fit, it must not be such a tight interference fit that the installer will have difficulty sliding the sleeve along the cable or over the cable connector.

The volatilities of the dilation compositions of this invention are sufficiently low such that there will be ample time for the repairer or installer to place the device 10 over the cable 2, make the cable connection, and then slide the device into position before substantial shrinkage occurs. However, the volatilities are also sufficiently high that once the device is in place, enough shrinkage takes place within thirty minutes (and preferably less) that the connection is thereafter effectively shielded from the elements. Further evaporation of any residual dilation composition merely enhances the quality of the seal. The combination compositions of this invention include mixtures of a wide range of volatilities, and a suitable selection for any application can easily be determined by those skilled in the art. For instance, the SOLTROL 10 hydrocarbon mixture has a volatile content of essentially 100%, an evaporation rate of >1 (where butyl acetate=1), and a vapor pressure of 2.2 psia at 100° F. (15.2 kPa at 37.8° C.). Similarly, the FLUOROCARBON 141B 1,1-dichloro-1-fluoroethane also has a volatile content of essentially 100% and a vapor pressure of 10.0 psia at 68° F. (68.9 kPa at 20° C.). It will be recognized that volatility will be affected by such factors as ambient temperature, humidity and initial degree of solvent saturation. Also, where more than one product is included in the initially sealed package (as will be common for small size products), the volatility must be sufficiently low that opening the package several times to withdraw individual products does not cause the products remaining in the package to become dried out and shrink. In the last case, it will be advantageous to have the installer be sure to close the vapor-tight package promptly after withdrawing the desired product, and it may also help to have a small amount of liquid solvent in the package to maintain saturation of the remaining products.

The situation where two cables are to be connected to form a splice is illustrated in FIG. 5. The structure and materials of the splice protector 10' are substantially identical to those of the cable connection protector 10 for connection of cables to transmission or receiving devices, except that the sleeve (indicated as 22') is essentially of double length. The sleeve 22' extends fully over both connector heads 6. (In FIG. 5 the sleeve 22' is shown in a partially retracted position as it would be when the splice is made. The phantom lines illustrate its final positioning.) When the device is exposed to the atmosphere and the swelling agent evaporates, the sleeve 22' shrinks and fully encapsulates the entire assembly with no opening through the outer sleeve 22' or at either of its outward ends.

It will be noted that since the device is made of a moisture resistant material to start with, installation of the device in inclement weather or under high humidity circumstances is greatly simplified. The installer only needs to place the protective device 10 over the cable, attach the connectors to the cable and the receiving device, shield the assembly from moisture as much as possible for the few moments it takes to make the electrical connection of the cable with the receiving device and then, still shielding the connection from the moisture, slide the protective device of this invention into place over the completed connection. Even thought the shrinkage of the protective device has only begun with the initial evaporation of the dilation composition, the moisture impervious nature of the sleeve 22, being made of a hydrophobic elastomeric material, sheds the moisture away from the coupling even while it is shrinking into place, thus effectively preventing moisture incursion even before the shrinkage is substantially completed. This is of considerable advantage for making repairs to damaged cables in inclement weather such as rain or snow, since the installer need only protect the coupling and coupling area of the cable and the receiving device for a few moments while the connection is made and the protective device moved into position. The same will be true for other weather elements, such as snow or sleet, although in the case of blowing dust the installer preferably will shield the connection area from dust as much as possible, to minimize the amount of dust which might otherwise blow into and become trapped underneath the sleeves. Entrapment of a minute amount of dust is normally of no consequence.

The device of this invention can also be in the form of an end cap 23 as illustrated in FIG. 4. By having one end closed the device can be used to protect a disconnected cable connector from the elements, and then have the cable later available for use merely by cutting off the capped end of the device. The device in the end cap configuration will be installed by having the outer sleeve 22 slid over the entire assembly of connector 4 and inner sleeve 20 prior to shrinkage.

It will be seen that this invention is a substantial improvement over the heat shrink products of the past, since the protective device of the present invention shrinks entirely by evaporation of the swelling agent and does not require any effort on the part of the installer, nor the application of any tools or heat sources. The present device is easy to install, merely sliding down the cable once the connection is made, and thus can be satisfactorily installed even in locations where access is difficult (such as a connection being made in a recessed hole) or when inclement weather such as rain would make use of a heating device either awkward or impossible. In addition, as compared to not only the older prior products but also the Jones products, the products of the present invention do not have any disagreeable or pervasive odor, and can be considered to be essentially odor-free. It will be recognized that this is an important advantage for use of the products generally, but in particular will be advantageous where the installer must work in a confined area, such as in a manhole or in a closed or cramped connection enclosure.

Those skilled in the art will immediately recognize that there are numerous embodiments of the present invention which, while not expressly described above, are clearly within the scope and spirit of the invention. The above disclosure is therefore intended to be exemplary only, and the scope of the invention is to be limited solely by the appended claims.

I claim:

1. A protective cover for a cable connector, said connector being affixed to an end of a cable and having an outside diameter greater than an outside diameter of said cable, said cover comprising:

an elongated annular sleeve having two ends and formed from a material expandable by a contact with a dilating chemical composition and shrinkable upon removal of said contact with said chemical composition;

said chemical composition comprising a mixture of a $C_7$–$C_8$ aliphatic hydrocarbon component and a fluorocarbon component, said hydrocarbon component and said fluorocarbon component being liquid and volatile at ambient conditions;

said cover with said sleeve in a chemically expanded state being moveable into a disposition covering said connector and a portion of said cable attached thereto, with said sleeve covering at least said portion of said cable and said connector;

whereby when said cover is so disposed over said connector and said portion of said cable and removed from contact with a source of said chemical composition, said chemical composition evaporates from said sleeve and said sleeve thereupon shrinks and covers the outside diameters of said connector and said attached portion of said cable sufficiently to form a tightly fitted and substantially immovable covering secured around said connector, thereby preventing said connector from coming into contact with adverse ambient components.

2. A cover as in claim 1 wherein said material comprises an elastomeric material.

3. A cover as in claim 2 wherein said material comprises a natural or synthetic rubber.

4. A cover as in claim 3 wherein said material comprises a synthetic rubber.

5. A cover as in claim 4 wherein said synthetic rubber is an EPDM rubber, a neoprene or a chlorosulfonate polyethylene rubber.

6. A cover as in claim 1 wherein said hydrocarbon component in said chemical composition comprises a plurality of $C_7$–$C_8$ hydrocarbon compounds.

7. A cover as in claim 6 wherein said plurality of $C_7$–$C_8$ hydrocarbon compounds comprises a mixture of heptane and octane isomers.

8. A cover as in claim 7 wherein a volumetric ratio of said octane isomers to said heptane isomers is in a range of 1.5–6:1.

9. A cover as in claim 8 wherein the volumetric ratio of said octane isomers to said heptane isomers is in the range of 2–5:1.

10. A cover as in claim 1 wherein said fluorocarbon component comprises a chlorofluorocarbon compound.

11. A cover as in claim 10 wherein said chlorofluorocarbon compound comprises a chlorofluoromethane, chlorofluoroethane or chlorofluoropropane compound.

12. A cover as in claim 10 wherein said chlorofluorocarbon compound comprises a dichlorofluoroethane compound.

13. A cover as in claim 12 wherein said dichlorofluorocarbon compound comprises a 1,1-dichloro-1-fluoroethane.

14. A cover as in claim 1 wherein prior to evaporation said hydrocarbon component is present in an amount in a range of about 60%–99% by volume of said chemical composition and said fluorocarbon component is present as a balance of said chemical composition.

15. A cover as in claim 14 wherein said hydrocarbon component is present in an amount in the range of about 80%–95% by volume of said chemical composition and said fluorocarbon component is present as the balance of said chemical composition.

16. A cover as in claim 15 wherein said hydrocarbon component is present in an amount in the range of about 90% by volume of said chemical composition and said fluorocarbon component is present as the balance of said chemical composition.

17. A cover as in claim 1 wherein removal of contact between said sleeve material and said chemical composition comprises an evaporation of said chemical composition upon exposure to air.

18. A cover as in claim 1 wherein said sleeve is open at both of said two ends, such that when said sleeve is shrunk into place a connecting face of said connector is exposed through one open of said two ends for electrical connection to an electrical device.

19. A cover as in claim 1 wherein said sleeve is open at both of said two ends, such that when said sleeve is shrunk into place a connecting face of said connector is exposed through one of said two open ends for electrical connection to a television transmission cable.

20. A cover as in claim 1 wherein said sleeve is open at only one of said two ends and closed at another of said two ends, said one open of said two ends being disposed around said portion of said cable, such that when said sleeve is shrunk into said place, a connecting face of said connector is protected from exposure to the ambient environment.

21. A cover as in claim 1 for covering a junction between two cables wherein said sleeve is open at both of said two ends, such that when said sleeve is shrunk into place said connector is disposed intermediate said sleeve and each of said cables extends out of said sleeve through a respective one of said two ends thus forming a tightly fitted and substantially immovable covering secured around said connector and at least a portion of each said cables, preventing said connector from coming into contact with adverse ambient components.

* * * * *